June 15, 1937.                G. C. RENSINK                2,083,865
METHOD OF MAKING FILTER ELEMENTS
Original Filed July 22, 1935

Inventor
George C. Rensink.
By Martin E. Anderson
Attorney

Patented June 15, 1937

2,083,865

UNITED STATES PATENT OFFICE 2,083,865

METHOD OF MAKING FILTER ELEMENTS

George C. Rensink, Denver, Colo.

Original application July 22, 1935, Serial No. 32,549. Divided and this application September 21, 1936, Serial No. 101,814

3 Claims. (Cl. 183—44)

This invention relates to improvements in filter elements and methods of making the same.

In air cleaners and other apparatus for filtering air and other gases it is necessary to employ a fibrous filter that is very weak and which must be reenforced by means of woven wire cloth such as is ordinarily used for sieves and screens. The filter cloth or material is composed of matted fibers formed into thin layers and may be likened to very thin and loose felt and in its normal state it is very difficult to handle without tearing.

It is the object of this invention to produce a method of treating the filter material so as to give it added strength to resist tearing while it is handled and which can be restored to its original state by lixiviation.

In order to describe the invention so that it can be readily understood and practiced by any one skilled in the art, reference will now be had to the accompanying drawing in which a section of filter has been shown and in which, Fig. 1 is a plan view showing a section of filter made in accordance with my invention;

The filter which forms the subject of this invention consists of two parallel layers of woven wire screen that have been designated by numeral 2. Located between the screens is a sheet of filter material 3 of the kind referred to above.

Before the filter cloth or material is put in place, it is saturated with a strong solution of salt or sugar, spread on a flat surface and left until it has become dry. The solution is preferably a strong or a saturated one and the salt or sugar or other equivalent soluble material crystallizes on the fibers of the filter material and the latter becomes hard and stiff so that it can be safely handled.

Figure 1:
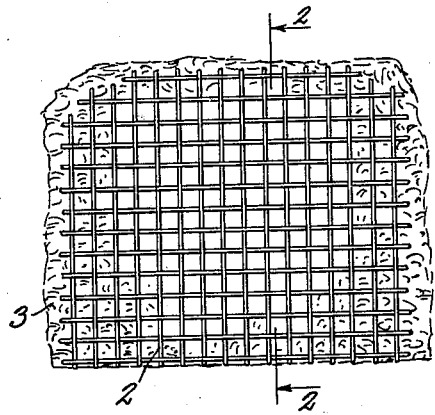
Figure 2:
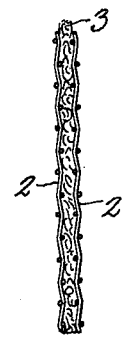
Fig. 2 is a section taken on line 2—2 Fig. 1.
Figure 3:
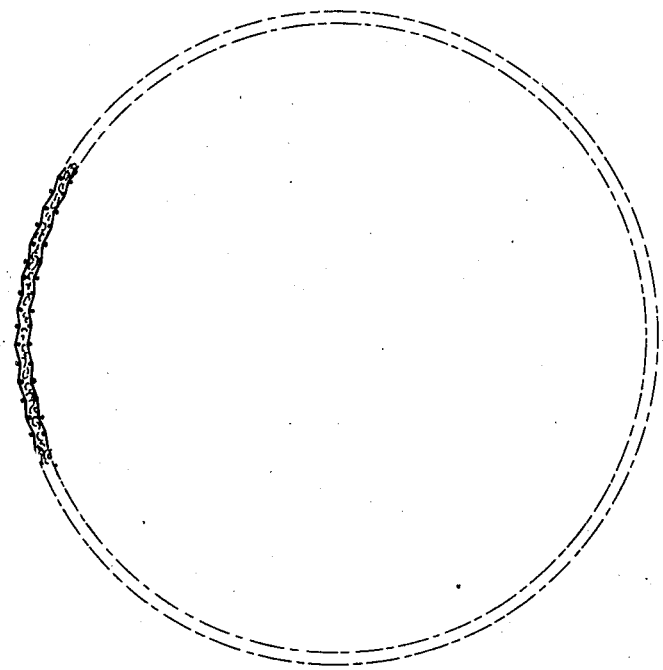
Fig. 3 is an end view of a cylindrical filter assembly.

The treated fibrous filter material is now cut to the desired size and shape and placed between the screen sections and the latter are assembled into the desired shape. In Fig. 3 a section of a cylindrical or a frusto-conical screen has been shown as this is the form that is usually employed in air cleaners.

After the filter has been assembled, the entire assembly is immersed in water and the salt, sugar or other soluble material used is dissolved and by washing the filter thoroughly is completely removed and therefore after the filter has dried the filter cloth will be in its original condition.

By the simple method just described any delicate fibrous material can be put in such a condition that it can be safely handled and can be restored to its original condition by washing thoroughly with clean water until the salt or sugar has been entirely removed.

In the above description salt has been used in its broad sense and is not limited to sodium chloride as there are many other soluble salts that can be used as, for example, Epsom salt.

When the filter cloth, which is preferably not a cloth in the sense that it is woven, is treated as described above, it becomes hard and strong and can be handled without danger of tearing.

The treated filter material 3 is clamped in place between sheets of screen and is protected by the latter and in this way it is possible to employ very delicate and efficient filter material and still run no appreciable risk of having it tear when in use.

A filter screen made in accordance with this invention has a comparatively smooth outer surface which prevents dust from adhering and the filter therefore does not clog with dust because the vibrations to which it is subjected when used on an automobile keeps its outer surface clean.

This application is a division of my copending application Serial Number 32,549 filed by me on July 22, 1935 which is now Patent No. 2,067,160, granted Jan. 5, 1937.

Having described the invention what I claim as new is.

1. The method of treating a sheet of delicate fibrous filter material to facilitate handling and for restoring it to its original condition, which comprises, saturating the sheet with a strong solution of a soluble crystalline compound, evaporating the liquid, whereby the compound will crystallize on the fibers, and after the fibrous material has been subjected to the required handling, removing the soluble compound by lixiviation.

2. The method of forming a filter element consisting of a thin sheet of fibrous filter material positioned between two or more sheets of woven wire, which comprises saturating the sheet with a strong solution of a soluble crystalline compound, evaporating the liquid, whereby the residue from the evaporation will be deposited on the fibers, assembling the filter element, and removing the soluble crystalline material by lixiviation.

3. The method of forming a filter element consisting of a thin sheet of fibrous filter material positioned between two sheets of woven wire, which comprises saturating the sheet with a strong solution of a soluble crystalline compound, evaporating the liquid, whereby the soluble compound will be deposited on the fibers, compacting the fibrous material between the sheets of woven wire, and thereafter removing the crystalline compound by lixiviation.

GEORGE C. RENSINK.